United States Patent
Lee

(10) Patent No.: US 6,890,396 B1
(45) Date of Patent: May 10, 2005

(54) METHOD OF MANUFACTURING UNVULCANIZED ADHESIVE WATERPROOF SHEET AND CONSTRUCTION METHOD USING THE SAME

(76) Inventor: Dae-Woo Lee, 8-1202, Imkwang Apt., 1162, Maetan-dong, Paldal-gu, Suwon, Kyunggi-do (KR)

( * ) Notice: Subject to any disclaimer, the term of this patent is extended or adjusted under 35 U.S.C. 154(b) by 0 days.

(21) Appl. No.: 09/712,029

(22) Filed: Nov. 13, 2000

(30) Foreign Application Priority Data

Nov. 15, 1999 (KR) .............................. 99-50626

(51) Int. Cl.⁷ .............................. B29C 47/00
(52) U.S. Cl. .................. 156/244.11; 156/338
(58) Field of Search .............. 156/244.11, 71, 156/242, 289, 338; 428/495

(56) References Cited

U.S. PATENT DOCUMENTS

| | | | | |
|---|---|---|---|---|
| 4,174,993 A | * | 11/1979 | Fujii et al. ............. | 156/244.11 |
| 4,707,528 A | * | 11/1987 | Koizumi et al. ............ | 525/432 |
| 5,049,610 A | * | 9/1991 | Takaki et al. ............ | 152/209.4 |
| 5,569,716 A | * | 10/1996 | Okamoto et al. ........... | 525/192 |
| 5,612,141 A | * | 3/1997 | Davis et al. ................ | 428/515 |
| 5,804,644 A | * | 9/1998 | Nakafutami et al. ........ | 524/572 |

FOREIGN PATENT DOCUMENTS

| | | |
|---|---|---|
| CN | 1071116 | 4/1993 |
| EP | 0799875 A2 | 8/1997 |
| JP | 9131834 A | 5/1997 |
| JP | 11303332 A | 11/1999 |

OTHER PUBLICATIONS

English Language Abstract of JP 11303332 A.
English Language Abstract of JP 9131834 A.
English Language Abstract of CN 1071116.

* cited by examiner

*Primary Examiner*—Jeff H. Aftergut
*Assistant Examiner*—John L. Goff
(74) *Attorney, Agent, or Firm*—Marger Johnson & McCollom, P.C.

(57) ABSTRACT

A method of manufacturing an unvulcanized adhesive waterproof sheet for performing a waterproof construction, and a construction method using the sheet are described. In the manufacturing method, a rubber main material composed of natural rubber and/or synthetic rubber is agitated with vulcanizing compound agent, age resister, adhesion-providing agent, softener, and filler. Vulcanizing agent is then added and agitated thereto in an open roller, thereby producing a raw rubber material, which is rolled and forced out with constant width and thickness. A releasing paper attaches to both surfaces of the waterproof sheet. In the construction method, one surface of the waterproof sheet attaches to a construction surface. The other sheet surface thereof attaches to wet mortar with a constant thickness. The waterproof sheet is turned into vulcanized rubber over time to achieve waterproofness of the construction.

4 Claims, No Drawings

METHOD OF MANUFACTURING UNVULCANIZED ADHESIVE WATERPROOF SHEET AND CONSTRUCTION METHOD USING THE SAME

This application relies for priority upon Korean Patent Application No. 1999-50626, filed on Nov. 15, 1999, the contents of which are herein incorporated by reference in their entirety.

FIELD OF THE INVENTION

The present invention generally relates to a method for manufacturing of an unvulcanized adhesive waterproof sheet and a construction method using the sheet. Particularly, the present invention relates to a method of manufacturing an unvulcanized adhesive waterproof sheet for waterproofing of a cut and cover tunnel, an underground building structure, or a concrete structure such as a building wall or an underground driveway. And, particularly, the present invention relates to a construction method using the sheet.

BACKGROUND OF THE INVENTION

As civil and construction technologies have progressed, complex and difficult construction methods can now easily be accomplished. However, defects often occur in waterproof construction situations. The defects cause water leakage and flooding. Moreover, the defects can cause a completed structure to sustain damage and lead to structural deterioration. Accordingly, a waterproof construction is important in the civil and construction technologies. At present, it is desirable to produce excellent waterproof materials which can exert a continuous and perfect waterproof function without subsequent need for maintenance or replacement.

Accordingly, a penetrating silicon waterproof agent, a rubberized asphalt sheet, a water soluble rubberized asphalt paint (aqueous paint film waterproof), a vulcanized rubber (boiled rubber) sheet, and an organic solvent rubber paint (oil paint film waterproof) have been used.

Since cement strength has improved to over 400 kg/cm2 due to development of the construction technology, penetration waterproof agent has proved to be a dispreferred material.

A rubberized asphalt sheet is cheap, and performs well a short time after installation when waterproofed. Unfortunately, the elasticity of the rubberized asphalt sheet degrades with the passage of time. In hot weather (e.g., summer), the sheet is dissolved and vaporized. As this happens, the sheet hardens and shrinks, resulting in water leakage and flooding.

Further, when the rubberized asphalt sheet is attached to external walls of a construction structure, humidity or moisture makes it impossible to attach the rubberized asphalt sheet to the concrete (or similar material) construction. Although a surface of the external wall may be dried well, the sheet only partially attaches thereto. Thus, a conventional rubberized asphalt sheet has fallen into disfavor.

In the water soluble rubberized asphalt paint, asphalt is mixed and agitated with emulsifier, and latex is added thereto. Accordingly, application of asphalt paint (i.e. the waterproof material) is simplified. However, since a main ingredient of the paint is asphalt, the paint has the same drawbacks as a rubberized asphalt sheet. Moreover, liquid asphalt paint is difficult to apply to form a waterproof film having a constant thickness if the construction surface is not planar.

A vulcanized rubber sheet is manufactured by boiling, and such a sheet has greater elasticity, tension, and tensile force than untreated rubber. Accordingly, the vulcanized rubber sheet is good for resistance to vibration, shock, and chemicals. In addition, physical properties and waterproof performance are excellent. The vulcanized rubber sheet, however, is difficult to completely attach to external walls of a structure. This results in water leakage and deterioration of the waterproof function.

In order to remedy drawbacks of the above-mentioned waterproof materials, organic rubber paint was developed which uses rubber as a base material. The rubber is dissolved in a volatile solvent, such as toluene and thinner, using a liquid agitator, to manufacture the organic solvent rubber paint. Compared with the vulcanized rubber sheet, the rubber paint is simpler to use. When the solvent is evaporated, the rubber paint is transformed to a rubber sheet. Therefore, organic rubber paint is a good waterproof agent. However, elasticity, peel strength, and tensile force of rubber paint are lower than those of a vulcanized rubber sheet because the manufactured rubber sheet is in an unvulcanized rubber gray state. If a paint film waterproof agent using an oil rubber as a main material is applied once, a rubber film is formed after evaporation of the solvent. At this time, the rubber film shrinks and the thickness thereof is reduced to 0.2 mm–0.4 mm. In order to form a waterproof film having a constant thickness (1 mm–2 mm), rubber paint must repeatedly be coated. Since the each coat of rubber paint must be left for 5–6 hours so as to dry the solvent, soil or dust is fixed to a coating surface. Therefore, the waterproof film is divided into a plurality of films. Further, air bubbles or air pockets are considerably likelier to be created under the rubber film formed by rubber paint.

Although concrete used in civil and construction structures is dried well, it generally has a moisture content of 10%–20%. In most case, concrete used in an underground structure has a moisture content of 80%–90%. As mentioned above, moisture content of the conventional waterproof agents is high. Therefore, the agents cannot attach to the concrete. Although a waterproof agent can be attached to concrete using a lamp or a burner, the resultant construction is still unstably attached and waterproof defects can be present.

In order to prevent damage of die waterproof film, the conventional waterproof agents must use a waterproof film protectant such as an EVA (ethylene vinyl acetate) bubbling sheet or a PE (polyethylene) fibrous sheet. However, the protectant is forced out or damaged and the waterproof film is attacked in a refilling process. Unfortunately, the protectant causes the defects. On the other hand, in order to protect the waterproof film, bricks are laid to form a wall, and then a refilling process is carried out. Such a manner increases both the term of the work and the cost.

SUMMARY OF THE INVENTION

It is therefore an object of the invention to provide a method of manufacturing an unvulcanized adhesive waterproof sheet and a construction method using the sheet which can simply perform a waterproof construction of a civil structure and maintain waterproof performance for a long time.

It is another object of the invention to provide a method of manufacturing an unvulcanized adhesive waterproof sheet and a construction method using the sheet which can easily and stably be attached to a construction surface containing humidity or moisture.

According to an aspect of the invention, a method of manufacturing an unvulcanized adhesive waterproof sheet comprises the steps of agitating a rubber main material composed of at least one of a natural rubber and a synthetic rubber with a vulcanizing compound agent, an age resister, an adhesion-providing agent, a softener, and a filler, and then adding and agitating a vulcanizing agent thereto in an open roller, thereby producing a raw rubber material; rolling and forcing out the raw rubber material with constant width and thickness, thereby manufacturing a waterproof sheet; and attaching a releasing paper to both surfaces of the waterproof sheet, being cut with a constant length.

The age resister includes at least one selected from a group consisting of phenylisopropyl-p-phenylenediamine, polymerized trimethyl dihydroquinoline, and styrenated phenol. The adhesion-providing agent includes at least one of tragacanth rubber and polyvinyl poval (PVA) that is affined with water.

According to another aspect of the invention, a construction method uses the unvulcanized adhesive waterproof sheet. One surface of the waterproof sheet attaches to a surface of a structure. The other sheet surface attaches to wet mortar, the sheet having a constant thickness. At this time, the waterproof sheet is turned into a vulcanized rubber so as to achieve waterproofness of the structure after attachment thereto of the sheet.

Before the waterproof sheet attaches to the surface, premier (produced by dissolving the raw rubber material in organic solvent) is coated on the construction surface. When the waterproof sheet attaches to the surface, the waterproof sheet and the construction surface are coupled and opposed with each other. Then, the overlapped portion adheres to the construction surface via the premier. Before the waterproof sheet attaches to the surface, water leakage, which may be caused by cracks of the construction surface, are closed using an adhesion agent produced by dissolving the raw rubber material in a selected amount of organic solvent. After the cracks are closed using the adhesion agent, the premier is coated on the surface.

DESCRIPTION OF THE PREFERRED EMBODIMENT

A waterproof agent made of asphalt is superior in performance to that made of rubber. Accordingly, a perfect waterproof sheet must have characteristics as follows. First, an ideal rubber film has a constant thickness. Second, the elements of the composite are monolithically and easily coupled to each other, and perfectly attach to each other. Third, a waterproof sheet to be used in construction should be a vulcanized rubber sheet having good elasticity, tension, and tensile force that are intrinsic properties of a rubber. Reference is directed to patents using an unvulcanized adhesive waterproof sheet using rubber as a main material (Korean Patent Application No. 95-5008 entitled "MANUFACTURING METHOD OF UNVULCANIZED ADHESIVE WATERPROOF SHEET AND CONSTRUCTION METHOD THEREOF" and Korean Patent Application No. 96-37884 entitled "METHOD OF MANUFACTURING UNVULCANIZED ADHESIVE WATERPROOF SHEET").

In these patents, an adhesive gray-state unvulcanized waterproof sheet with a vulcanized agent is manufactured to have a constant width and thickness. Accordingly, in a construction process using the sheet, the thickness is constant and attaching surfaces are monolilhically attached to each other. This makes it possible to attach a piece of rubber sheet to even a wide area. The sheet is secondarily-activated at ordinary temperature, being turned into a vulcanized rubber sheet. Tension and tensile force of the sheet can fill concrete cracks due to sealing thereof. As a result, the sheet provides a perfect water-stopping effect.

However, the adhesive gray-state unvulcanized waterproof sheet adding a vulcanized agent suffers from an aging phenomenon. For example, when the sheet is exposed to sunshine, rain, and wind on a rooftop of a building for three or four months, cracks are created on a surface of the sheet. Therefore, the present invention provides a new and improved manufacturing method of an unvulcanized adhesive waterproof sheet and a waterproof construction thereof, with repetitive test and study.

The use of the present adhesive waterproof sheet in construction is performed through the following steps. Primer (produced by dissolving a raw material of rubber in a constant amount of organic solvent) is coated on a construction surface. The unvulcanized rubber sheet is attached to the surface. Wet cement mortar, which is kneaded with water, attaches to protect the attached waterproof film. The mortar is hardened and cured. Finally, a refilling process is performed. After the waterproof construction is finished, the sheet is activated to be a molded vulcanized rubber with time. More specifically, primer is coated on, e.g., a cut and cover tunnel, an underground structure of a building, and a building wall. With an adhesive unvulcanized rubber sheet in an adhesive rubber gray state, an attachment to the construction surface is monolithically performed without an expansion opening. Wet mortar kneaded with water attaches onto a surface of the waterproof sheet. The wet mortar is dried and cured. Since the mortar and adhesive unvulcanized rubber are adhesive, they strongly attach. The unvulcanized rubber sheet is secondarily-activated at ordinary temperature, being turned into a molded vulcanized rubber sheet. The molding vulcanized rubber sheet then is turned into a rubber sheet having elasticity, tension, and tensile force that are intrinsic properties of the rubber, creating a perfect waterproof construction effect. Using the molded and vulcanized rubber sheet as a medium, both walls attach to each other by concrete. Therefore, it is possible to achieve a waterproof construction process without defects in waterproofness.

An unvulcanized adhesive waterproof sheet of this invention is produced by adding a rubber material composed of at least one of natural rubber and synthetic rubber to a vulcanizing agent, an age resister, an adhesion-providing agent, a softener, a filler, and a vulcanizing agent. Such agents are added to natural rubber or synthetic rubber or combination thereof or a combined rubber produced by adding rubber powder or recycled rubber to the natural rubber or the synthetic rubber. The agents and one of the rubbers are then mixed and agitated in a closed mixer (e.g., kneader or Bandury), being evenly distributed. The agitation is performed in an open roller, with addition of the vulcanizing agent. The agitated raw material of the adhesive rubber is rolled in a calender, having a constant width and a thickness of 1 mm–5 mm. The rolled material is fetched to the sheet, and then is cut with a constant thickness. Finally, the rolled and fetched rubber sheet is rolled up, with silicon-coated releasing paper attaching to both surfaces thereof.

The unvulcanized adhesive rubber sheet is used for unexposure. Durability of the sheet is over the warranty (five years). In order to maintain a waterproof function for a long time, it is required to add a special age resister to the sheet. Therefore, the present invention uses age resisters, "3C" (phenylisopropyl-p-phenylenediamine), "RD" (Polymerized trimethyl dihydroquinoline), and "SP" (Styrenated phenol). The "3C" is good for heat resistance, flexure-crack resistance, oxidation resistance, and ozone resistance. The "RD" is good for heat resistance and oxidation resistance. And, the "SP" is good for flexure resistance, oxidation resistance, and ozone resistance. Adding such age resisters to the sheet, the sheet maintains an initial state for a long time. When the sheet attaching to a wall of a rooftop is left for two years (two summers and winters), cracks or rips are not created on a surface of the sheet. In case of an unexposure construction, the sheet exerts an excellent waterproof function for a long time.

Generally, a waterproof construction process is desirable for an external wall of a structure. Accordingly, the construction is performed in an external wall of concrete using a waterproof material. In order to protect the waterproof material, an EVA blowing sheet or PE fibrous sheet is applied to an outside of the waterproof material. However, the EVA blowing sheet or PE fibrous sheet is difficult to attach to a corner or a flexure (curved construction surface), and incompletely attaches to the waterproof material. In a refilling process, a protectant is forced out or damaged and a waterproof film is attacked. Unfortunately, the protectant also causes defects. Instead of EVA blowing sheet and PE fiber, cement mortar is used as a waterproof protectant so as to solve such defects and protect a waterproof film. Therefore, the rubber sheet can be simply attached to a corner or a complex flexure. Using a waterproof sheet as a sandwiched medium, an inside construction surface adheres to an outside construction surface, the sheet being closed therebetween to achieve a perfect waterproof construction.

In order to use mortar as a waterproof film protectant, the unvulcanized adhesive waterproof sheet adds Tragacanth Gum and PVA (polyvinyl Poval) resin to the adhesion-providing agent. The Tragacanth Gum and PVA resin is affined with water and is compatible with other material, being mixed well. The sheet containing an adhesion-providing agent and the raw rubber material are dissolved in a constant amount of organic solvent, forming premier which enables the sheet to perfectly attach to a construction surface containing moisture. Even though an underground structure contains moisture on the order of 80%–90%, the sheet can eminently attach thereto. According to experimental results, when the premier is coated on a brick or a concrete piece with gathered water and the unvulcanized adhesive rubber sheet adhered thereto, the adhesion is strong. Since a surface of a structure in a work site generally has poor adherence conditions, the primer is used to enable an unvulcanized adhesive waterproof sheet to attach to a construction surface. And, the primer is used at an overlap portion of waterproof sheets.

In order to overcome conventional problems (exfoliation, cement exclusion, crack, etc.), the premier is coated on an external surface of concrete and the unvulcanized adhesive rubber sheet adheres thereon. Then, wet mortar kneaded with water attaches to a surface of the sheet. If the water is dried and adhesion is created by curing the cement mortar, the waterproof film and the cement mortar strongly attach to each other. The sheet attaching to the mortar can absorb external impact and suppress creation of cracks.

In another embodiment, a construction method using the unvulcanized adhesive waterproof sheet utilizes putty that is produced by dissolving a raw rubber material in organic solvent such as toluene. The putty seals and prevents water leakage caused by cracks in a construction surface. Using the putty, the cracks are closed. If the premier is then coated on the construction surface repeatedly and the sheet attached thereon, a better construction will be achieved.

In view of the cost, a waterproof construction method using an unvulcanized adhesive waterproof sheet is cheaper than a conventional method using an EVA blowing sheet, a PE fibrous sheet or a bricklaying method. And, such a waterproof construction method can solve conventional difficulties (e.g., a waterproof construction cannot be performed to a wet mortar kneaded in water as well as to a structure surface having humidity or moisture, and the construction in these situations tends to result in construction defects).

PREFERRED EMBODIMENT

An unvulcanized adhesive waterproof sheet of this invention is composed of composites having a mixture ratio, as follows:

| | | |
|---|---|---|
| Rubber Main Material | One of Natural rubber and Synthetic rubber (SBR rubber, 1R rubber, EPT rubber, 2R rubber, CR rubber, NBR rubber, Urethane rubber, and CPE rubber) or Combination thereof | 100% |
| Vulcanizing Compound Agent | Stealic Acid | 1% |
| | Magnesium Oxide | 5% |
| | Zinc Oxide | 5% |
| | Sulfur | 2% |
| Age Resister | Age Resister 3C (Phenylisopropyl-p-phenylenediamine) | 2% |
| | Age Resister RD (polymerized trimethyl dihydroquinoline) | 1.5% |
| | Age Resister SP (Styrenated phenol) | 2% |
| Adhesion-providing Agent | Polybutene | 6% |
| | Phenol-Formaldehyde-Resin | 8% |
| | Petroleum Resin | 10% |
| | PVA (Polyvinyl poval) | 12% |
| | Tragacanth Gum | 5% |
| Softener | Process Oil | 14% |
| Filler | Calcium Carbonate | 40% |
| | Clay | 15% |
| Vulcanizing Agent | DM | 1.6% |
| | D | 1% |
| | T/T | 1% |
| | NA22 | 1% |

Intrinsic physical properties and characteristics of the rubber compound materials are different from each other. Therefore, based on usage of a waterproof sheet or user preference, only one of natural rubbers, synthetic rubbers, or a combination thereof may be used. Alternatively, two and more kinds of synthetic rubbers may be used. For example, a CR rubber main material has the best properties such as adhesion, durability, and chemical resistance.

The age resisters (3C, RD, and SP) are added to an unvulcanized adhesive waterproof sheet, improving durability. In order to maintain strong adhesion between composites of the sheet and provide adhesiveness, the adhesion-providing agents (polybutene, phenol-formaldehyde-resin, and petroleum resin) are added thereto. And, in order to provide adhesion and adhesiveness to wet mortar kneaded with water and a structure having humidity and moisture, the tragacanth gum and the PVC resin which are compatible with other composites are added thereto. Since there are synergy and compatibility between a resin of an adhesion-providing agent and a water-compatible resin, adhesion and adhesiveness can be improved. And, a waterproof construction can smoothly be performed at dry and wet conditions.

A method of manufacturing an unvulcanized adhesive waterproof sheet is composed of the following steps. One of natural and synthetic rubbers (SBR rubber, 1R rubber, EPT rubber, 2R rubber, CR rubber, NBR rubber, Urethane rubber, and CPE rubber) or combination (100%) thereof is fully agitated in a closed mixture agitator "Kneader Mixer" or "Bandury Mixer". The vulcanizing compound agents, stealic acid (1%), magnesium oxide (5%), zinc oxide (5%), and sulfur (2%) are evenly mixed therewith. The age resisters, 3C (2%), RD (1.5%), and SP (2%) are then agitated, being mixed and distributed evenly. Then, the adhesion-providing agents, polybutene (6%), phenol-formaldehyde-resin (8%), petroleum resin (10%), tragacanth gum (5%), and PVA (12%) are fully mixed and agitated therein. And then, the softener, process oil (14%) as well as the filler, calcium carbonate (40%) and clay (15%) are fully mixed and agitated therewith. With adhesive unvulcanized raw rubber material agitated in a roller, vulcanizing agents, DM (1.5%), D (1%), T/T (1%), and NA22 (1%) are added, being distributed and mixed evenly. In a calendar machine, the sheet is rolled and forced out with a constant width and a thickness of 1 mm–5 mm. Finally, the sheet is adhered to releasing paper of a high-density film (HD), polypropylene (PP), and polyethylene (PE), rolled up and cut with a constant length. The releasing paper of the rolled waterproof sheet must be uncovered in a waterproof construction. To be used as a material of the releasing paper, silicon is coated on both surfaces of a synthetic resin film such as HD, PP, and PE.

Since the unvulcanized adhesive waterproof sheet has adhesiveness therein, its adhesion to concrete is excellent. However, a construction surface of a structure in a work site is generally contaminated by cement powder, soil, dust, and dirt. Accordingly, the waterproof construction method utilizes premier (viscosity, 500–600) produced by dissolving the raw rubber material (weight, 50) in toluene (weight, 150). That is, the premier is rendered on a concrete surface and the unvulcanized waterproof sheet attaches thereto, achieving a stronger attachment. Similarly, a coupling portion more strongly adheres by means of the premier.

In comparison with a conventional method, the present invention makes it possible to simply coat the premier on a structure using a brush. The premier can effectively be coated on even metal or rusted iron, so that the unvulcanized waterproof sheet simply and strongly attaches thereto.

In case of water leakage caused by cracks of a construction surface, an adhesion agent (viscosity, 1500–1700) produced by resolving the raw rubber material (weight, 500) in toluene (weight, 70) is utilized. After the cracks are closed using the adhesion agent, the water leakage is stopped and the premier is coated thereon. After solvent is dried and a premier film is formed, the premier recoated thereon. A rubber sheet strongly attaches to the premier then, so that adhesion is achieved.

In the waterproof construction method, the unvulcanized adhesive waterproof sheet attaches to a construction surface. Mortar of 10 mm–20 mm then attaches to a surface of the waterproof sheet. The more cement component is contained in mortar, the better adhesion is. Accordingly, this quality of the mortar is higher than that of standard mortar (cement 1:sand 2.5). Moisture of the attaching cement mortar is evaporated to create adhesion. After five or seven days, the mortar is cured to have strong adhesion. The attaching mortar having the strong adhesion can resist external impact (i.e., overcome exfoliation, evasion, breakage, and cracks).

Using the unvulcanized adhesive waterproof sheet as a medium, internal and external walls completely attach to each other. Thus, defects cannot occur.

In a waterproof construction to an external wall of a building, the premier is coated on the external wall to form a rubber film. Mortar kneaded with water attaches to a surface of the rubber film, being cured. Sidewalls are refilled with a good quality of earth and sand. Then, water is sprayed to harden the earth and sand. An underground parking lot or a rooftop is amenable to a mortar (thickness, 2 cm–3 cm) construction, and is refilled in the same manner. The waterproof construction is then conducted as previously described. At ordinary temperatures, the unvulcanized adhesive waterproof sheet is secondarily-activated, being turned into a vulcanized rubber over time (1–2 months in summer, 2–3 months in winter). Therefore, the waterproof sheet has high tension and tensile force, and maintains its waterproof function. Further, heat resistance, cold resistance, and chemical resistance of the waterproof sheet are sufficiently good that the waterproof sheet can maintain its good physical properties in severe conditions. As a result, the waterproof sheet can maintain a waterproof function over the life of the building.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A method of manufacturing an unvulcanized adhesive waterproof sheet, the method comprising:

agitating a rubber main material made of either one of a natural rubber and a synthetic rubber with a vulcanizing compound agent, an age resister, an adhesion-providing agent, a softener, and a filler, and then adding and agitating a vulcanizing agent thereto at an open roller to produce a raw rubber material;

pressing the raw rubber material into a waterproof sheet with constant width and thickness; and attaching a releasing paper to both surfaces of the waterproof sheet to be cut into a plurality of sections;

wherein the weight of the adhesion-providing agent is about 41% of the weight of the rubber main material to enhance adhesiveness for an object to be attached thereto.

2. The method as set forth in claim 1, wherein the adhesion-providing agent includes at least one selected from the group consisting of polybutene, phenol-formaldehyde-resin, and petroleum resin to maintain strong adhesion between the compositions and to provide a viscosity to the compositions.

3. The method as set forth in claim 1, wherein the adhesion-providing agent includes at least either one of tragacanth rubber and PVA resin to provide the adhesiveness for a moisture-laden object to be attached thereto.

4. The method as set forth in claim 1, wherein the plurality of sections each have a constant length.

* * * * *

UNITED STATES PATENT AND TRADEMARK OFFICE
CERTIFICATE OF CORRECTION

PATENT NO. : 6,890,396 B1
APPLICATION NO. : 09/712029
DATED : May 10, 2005
INVENTOR(S) : Lee

It is certified that error appears in the above-identified patent and that said Letters Patent is hereby corrected as shown below:

At column 2, line 44, please replace "die waterproof film" with --the waterproof film--

At column 3, line 13, please replace "at least one selected" with --at least one compound selected--

At column 3, line 66, please replace "monolilhically" with --monolithically--

At column 4, lines 62 and 63, please replace "The unvulcanized adhesive rubber sheet is used for unexposure." with --The unvulcanized adhesive rubber sheet can be used in construction applications where the sheet will be exposed to weather.--

At column 4, line 64, please replace "Durability of the sheet is over the warranty (five years)." with --Durability of the sheet is five years.--

At column 5, line 3, please replace ""RD" is good for" with --"RD" compound--

At column 5, line 5, please replace "And, the "SP"" with --The "SP" compound--

At column 5, line 6, please replace "Adding such age resisters to the sheet, the sheet maintains an initial state for a long time." with --Adding such age registers to the sheet results in a sheet which maintains its initial state for a long time.--

At column 5, line 8, please replace "When the sheet attaching to a wall of a rooftop is left for two years" with --When the sheet attached to a rooftop is left for two years--

UNITED STATES PATENT AND TRADEMARK OFFICE
CERTIFICATE OF CORRECTION

PATENT NO. : 6,890,396 B1
APPLICATION NO. : 09/712029
DATED : May 10, 2005
INVENTOR(S) : Lee

It is certified that error appears in the above-identified patent and that said Letters Patent is hereby corrected as shown below:

At column 5, line 9, please replace "In case of an unexposure construction" with --In case of a sun exposure construction application--

Signed and Sealed this

Ninth Day of September, 2008

JON W. DUDAS
*Director of the United States Patent and Trademark Office*